United States Patent [11] 3,573,863

| [72] | Inventors | Bernardus Johannes Doors;<br>Petrus Simon Admiraal, Emmasingel,<br>Eindhoven, Netherlands |
|---|---|---|
| [21] | Appl. No. | 777,081 |
| [22] | Filed | Nov. 19, 1968 |
| [45] | Patented | Apr. 6, 1971 |
| [73] | Assignee | to U. S. Philips Corporation<br>New York, N.Y. |
| [32] | Priority | Nov. 30, 1967 |
| [33] | | Netherlands |
| [31] | | 6716280 |

[54] VACUUM-INSULATED VALVE
5 Claims, 1 Drawing Fig.
[52] U.S. Cl. .................................................. 137/375,
251/335, 251/266
[51] Int. Cl. ..................................................... F16k 27/00,
F16k 31/50
[50] Field of Search ............................................ 137/375;
251/227, 335

[56] References Cited
UNITED STATES PATENTS

| 2,831,326 | 4/1958 | Richards et al. ............... | 137/375X |
| 3,315,700 | 4/1967 | Greenwood ................... | 137/375 |
| 3,344,803 | 10/1967 | Charles et al. ................. | 137/375 |
| 3,366,135 | 1/1968 | Ishizaki ......................... | 137/375 |

FOREIGN PATENTS

| 1,249,396 | 11/1960 | France ......................... | 137/375 |

*Primary Examiner*—Henry T. Klinksiek
*Attorney*—Frank R. Trifari

ABSTRACT: A valve for controlling the flow of cryogenic fluids has an inner housing and an outer housing with a vacuum space between the two housings, a valve and seat within the inner housing, and a valve stem extending outward through and sealed to a first bellows of the inner housing, through the vacuum space, and through and sealed to a second bellows of the outer housing.

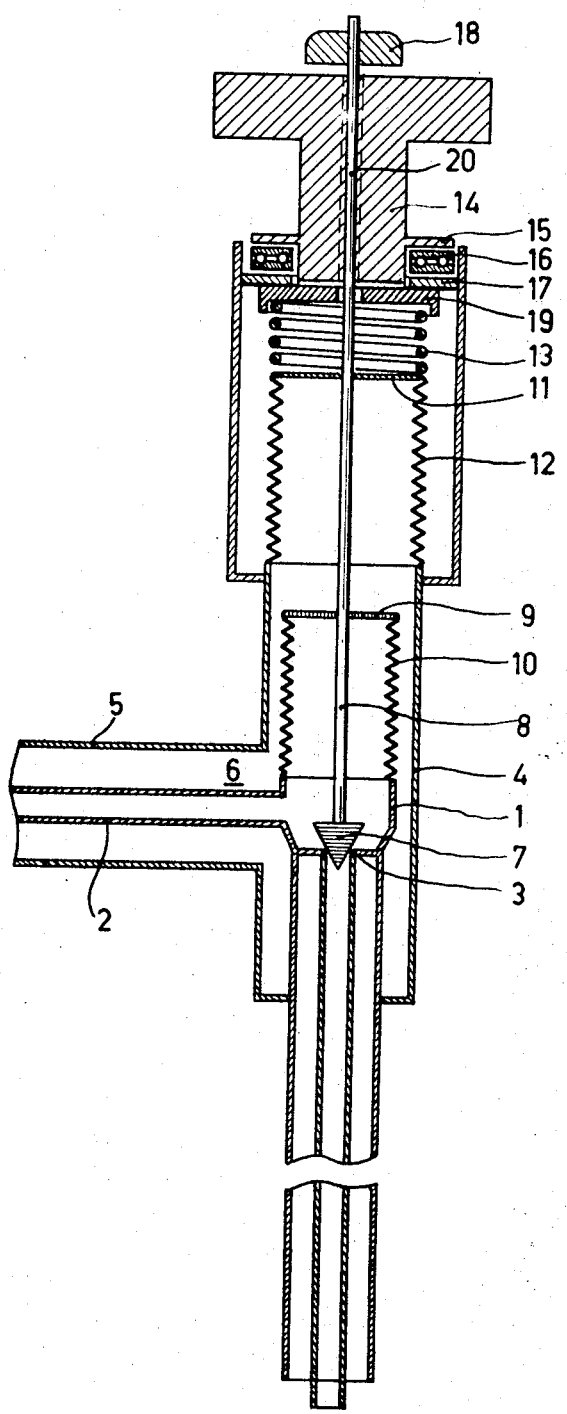

VACUUM-INSULATED VALVE

The invention relates to a stop valve which is particularly suitable to be used for controlling the passage through a double-walled vacuum-insulated conduit. This stop valve comprises an inner housing which can on the one hand be connected to a conduit and is on the other hand provided with a valve seat, and an outer housing surrounding it which can be connected to the vacuum space surrounding the said conduit, the stop valve including a valve applied at one end of a valve stem which valve cooperates with the said seat, the valve stem passing through the walls of the two housings via seals to the exterior and cooperating in situ with means which can lift or close the valve.

Stop valves of the relevant type are known and are used in conduits for transport or cryogenic liquids, such as liquid helium.

A drawback of known stop valves is their intricate, expensive construction which mainly originates from the fact that the valve stem twice passes through a wall, thus necessitating two seals. In addition, during operation one of these seals is at very low temperature, for example, the temperature of liquid helium.

It is an object of the invention to provide a stop valve of the type described which has a simple and hence cheap construction and in which leakage is completely obviated.

To achieve the envisaged object the stop valve according to the invention is characterized in that on the one hand the valve stem is connected in a gastight manner to the inner housing by means of a first bellows, and on the other hand in a gastight manner to the outer housing by means of second bellows. By using two bellows, one as a seal between atmosphere and vacuum space and one as a seal between vacuum space and the space containing liquid, a very simple construction is obtained which shows no leakage and has a minimum quantity of material to be cooled.

According to a further favourable embodiment a compression spring is provided between the second bellows and a rigid portion of the outer housing, a nut being present which cooperates with screw thread on the valve stem and which is formed in such manner that it engages a rigid portion of the outer housing when it is relatively displaced along the valve stem towards the valve. In this manner the force of closure of the valve is determined by the compression spring, thus preventing too much tightening of the valve, which might render it defective. A further advantage is that the portions of the stop valve, which are at a low temperature during operation, can be of minimum weight. In addition thermal expansion occurring after tightening is absorbed by the spring.

In order that the invention may be readily carried into effect, it will now be described in detail, by way of example, with reference to the accompanying drawing, which shows a stop valve according to the invention.

The reference numeral 1 indicates an inner housing which can be connected to a conduit 2 which is connected to a vessel containing liquid helium. The housing 1 is further provided with a valve seat 3. The inner housing 1 is surrounded by an outer housing 4 which can be connected to conduit 5 surrounding conduit 2. Vacuum prevails in the space 6 between conduits 2 and 5 and between inner housing 1 outer housing 4. A valve 7, which is arranged on a valve stem 8, cooperates with valve seat 3. A plate 9 is soldered onto the valve stem 8 which plate is connected by means of first bellows 10 to the housing 1. Furthermore, a plate 11 is soldered onto the valve stem 8 which is connected by means of a second bellows 12 to the outer housing 4. In this manner a gastight seal is obtained between the vacuum space 6 and the space in the inner housing 1 and between the vacuum space and the surroundings.

A compression spring 13 is provided between the plate 11 and a spring washer 19. The spring washer 19 engages a rigid portion 17 of the outer housing 4. A shoulder 15 of a nut 14 engages a thrust bearing 16 which is supported by the portion 17 rigidly connected to the outer housing 4. A stop 18 is present above the nut 14. The upper part 20 of the valve stem is provided with screw thread. By turning nut 14 upwards, valve stem 8 and valve 7 move towards the seat under the action of spring 13. When nut 14 disengages from the bearing 16, the force by which valve 7 is pressed against seat 1 is determined by spring 13 only. In this manner the valve can therefore never be tightened too much. Thermal expansions are also absorbed by the spring 13 in this position of the valve. When nut 14 is turned in the other direction, it engages thrust bearing 16 again, and the valve 7 is lifted upon further turning so that liquid helium can flow through the conduit 2.

In this manner an extremely simple stop valve construction is obtained which shows no leakage and has little material to be cooled.

We claim:

1. A stop valve comprising:
    a. an inner housing including inlet and outlet openings thus defining a conduit, and intermediate the openings a valve seat;
    b. an outer housing generally surrounding the inner housing and defining a vacuum space between the housings;
    c. a first bellows having one end secured to the inner housing, with the conduit and interior of the first bellows in communication, and a remote end closed with a first seal;
    d. a second bellows having one end secured to the other housing, with the vacuum space and interior of the second bellows in communication and a remote end closed with a second seal;
    e. a valve cooperating with the valve seat within the inner housing, and a valve stem having one end connected to the valve and a remote end, the stem extending outward through and sealed to the first seal, through the vacuum space, and through and sealed to the second seal, whereby the valve and seat, and at least portions of the inner housing and valve stem are within the vacuum space and outer housing.

2. A valve according to claim 1, further comprising operating means at the outer housing and engaged to the remote end of the valve stem for moving the stem axially to open and close the valve.

3. A valve according to claim 2 wherein said operating means includes a spring engaged to and urging said second seal and attached valve stem axially to close the valve, and a drive member engaging the valve stem for driving the stem axially to open the valve.

4. A valve according to claim 3, wherein said outer housing further comprises a support partition through which said valve stem extends outward, said spring being disposed between said support partition and said second seal, and said drive member has threaded engagement with said valve stem and has a bearing surface adjacent said support partition.

5. A valve according to claim 4, further comprising a bearing element disposed between said bearing surface of the drive member and said support partition, the bearing element prevents overtightening of the valve by excessive rotation of said drive member.

PO-1050
(5/69)

UNITED STATES PATENT OFFICE
CERTIFICATE OF CORRECTION

Patent No. 3,573,863        Dated April 6, 1971

Inventor(s) BERNARDUS JOHANNES DOORS ET AL

It is certified that error appears in the above-identified patent and that said Letters Patent are hereby corrected as shown below:

Col. 2, line 33, after "secured to the" delete "other"

and insert --outer

Signed and Sealed this 17th day of October 1

(SEAL)
Attest:

EDWARD M. FLETCHER, JR.
Attesting Officer

ROBERT GOTTSCHALK
Commissioner of Pate